(12) United States Patent
Message et al.

(10) Patent No.: US 9,731,703 B2
(45) Date of Patent: Aug. 15, 2017

(54) HYBRID ELECTRIC VEHICLE CONTROLLER AND METHOD

(71) Applicant: Jaguar Land Rover Limited, Coventry (GB)

(72) Inventors: Simon Message, Coventry (GB); Matthew Hancock, Coventry (GB); Richard Kirkman, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/903,107

(22) PCT Filed: Aug. 20, 2014

(86) PCT No.: PCT/EP2014/067751
§ 371 (c)(1),
(2) Date: Jan. 6, 2016

(87) PCT Pub. No.: WO2015/024970
PCT Pub. Date: Feb. 26, 2015

(65) Prior Publication Data
US 2016/0167637 A1   Jun. 16, 2016

(30) Foreign Application Priority Data
Aug. 21, 2013  (GB) .................................. 1314991.9

(51) Int. Cl.
*G05D 1/00* (2006.01)
*B60W 20/10* (2016.01)
(Continued)

(52) U.S. Cl.
CPC .............. *B60W 20/10* (2013.01); *B60K 6/48* (2013.01); *B60W 10/06* (2013.01); *B60W 10/08* (2013.01);
(Continued)

(58) Field of Classification Search
USPC ........................................................ 701/22
See application file for complete search history.

(56) References Cited

U.S. PATENT DOCUMENTS 5,893,272 A * 4/1999 Hanselmann ........ B60H 1/3208
62/133
2007/0213921 A1* 9/2007 Yamaguchi ........... B60W 10/06
701/115
(Continued)

FOREIGN PATENT DOCUMENTS

EP    1 602 522 A1   12/2005
EP    1 833 160 A2    9/2007
(Continued)

OTHER PUBLICATIONS

Combined Search and Examination Report, GB 1314991.9, Mar. 21, 2014, 7 pages.
(Continued)

*Primary Examiner* — Muhammad Shafi
(74) *Attorney, Agent, or Firm* — Myers Bigel, P.A.

(57) ABSTRACT

Embodiments of the present invention provide a controller for a vehicle having a powertrain comprising an engine, the controller being operable to: receive a signal indicative of an amount of powertrain drive torque required to be applied to one or more wheels, powertrain wheel drive torque demand; and receive a signal indicative of an amount of powertrain load torque required to support an auxiliary powertrain load, powertrain auxiliary load torque demand, that is in addition to the powertrain wheel drive torque demand, the controller being operable to limit the amount of powertrain drive torque available to the one or more wheels and to limit the amount of powertrain load torque available to support the auxiliary load such that when a sum of the amount of powertrain wheel drive torque demand and the amount of auxiliary load torque demand exceeds the available pow- (Continued)

ertrain torque, the one or more auxiliary loads may still receive at least a prescribed minimum auxiliary load powertrain torque amount.

13 Claims, 3 Drawing Sheets

(51) Int. Cl.
  *B60K 6/48* (2007.10)
  *B60W 10/08* (2006.01)
  *B60W 30/188* (2012.01)
  *B60W 10/06* (2006.01)
(52) U.S. Cl.
  CPC ...... *B60W 30/188* (2013.01); *B60W 30/1886* (2013.01); *B60K 2006/4825* (2013.01); *B60W 2510/305* (2013.01); *B60W 2520/10* (2013.01); *B60W 2720/30* (2013.01); *Y02T 10/6221* (2013.01); *Y02T 10/6252* (2013.01); *Y10S 903/93* (2013.01)

(56) References Cited

U.S. PATENT DOCUMENTS

| | | |
|---|---|---|
| 2007/0281826 A1 | 12/2007 | Hindman et al. |
| 2009/0069154 A1 | 3/2009 | Wegeng et al. |
| 2010/0273605 A1 | 10/2010 | Kawasaki et al. |
| 2013/0041530 A1* | 2/2013 | Schulte ............... B60W 20/106 701/22 |
| 2013/0151049 A1 | 6/2013 | Higashitani et al. |

FOREIGN PATENT DOCUMENTS

| | | |
|---|---|---|
| JP | 2007-106177 A | 4/2007 |
| JP | 2013-014155 A | 1/2013 |

OTHER PUBLICATIONS

Notification of Transmittal of the International Search Report and the Written Opinion, PCT/EP2014/067751, Jun. 25, 2015, 7 pages.

\* cited by examiner

All values are normalized to 1.0 where 1.0 is the total output of the powertrain.

HYBRID ELECTRIC VEHICLE CONTROLLER AND METHOD

RELATED APPLICATIONS

This application is a 35 U.S.C. §371 national stage application of PCT Application No. PCT/EP2014/067751, filed on Aug. 20, 2014, which claims priority from Great Britain Patent Application No. 1314991.9 filed on Aug. 21, 2013, the contents of which are incorporated herein by reference in their entireties. The above-referenced PCT International Application was published in the English language as International Publication No. WO 2015/024970 A2 on Feb. 26, 2015.

TECHNICAL FIELD

The present invention relates to a controller for a hybrid electric vehicle. In particular but not exclusively, embodiments of the present invention relate to a controller for a hybrid electric vehicle operable in a parallel mode.

BACKGROUND

It is known to provide a hybrid electric vehicle having an internal combustion engine operable to provide drive torque to drive the vehicle and an electrical propulsion motor operable to provide drive torque when the vehicle is operated in an electric vehicle (EV) mode. A vehicle control system determines when to switch the internal combustion engine on or off, and when to open or close a clutch KO between the engine and a transmission. In some vehicles the electric propulsion motor is integrated into the transmission.

It is also known to provide an electric machine as a starter for cranking the engine when an engine start is required. Known starters include belt-integrated starter/generators. Such devices are operable as electrical generators driven by the engine as well as a starter.

SUMMARY OF THE INVENTION

Embodiments of the invention may be understood with reference to the appended claims.

Aspects of the present invention provide a control system, a vehicle and a method.

In one aspect of the invention for which protection is sought there is provided a controller for a vehicle having a powertrain comprising an engine, the controller being operable to:

receive a signal indicative of an amount of powertrain drive torque required to be applied to one or more wheels, powertrain wheel drive torque demand; and receive a signal indicative of an amount of powertrain load torque required to support an auxiliary powertrain load, powertrain auxiliary load torque demand, that is in addition to the powertrain wheel drive torque demand, the controller being operable to limit the amount of powertrain drive torque available to the one or more wheels and to limit the amount of powertrain load torque available to support the auxiliary load such that when a sum of the amount of powertrain wheel drive torque demand and the amount of auxiliary load torque demand exceeds the available powertrain torque, the one or more auxiliary loads may still receive at least a prescribed minimum auxiliary load powertrain torque amount.

Embodiments of the present invention have the advantage that one or more of the auxiliary loads may be provided with powertrain torque even when the total powertrain torque demand exceeds the available powertrain torque. User enjoyment of a driving experience may therefore be enhanced in some embodiments since at least some power is available to drive one or more of the auxiliary loads. The auxiliary loads may include for example a climate control system arranged to maintain a vehicle cabin at an acceptable temperature. If an electrically powered climate control system is denied power by the powertrain and must rely instead on power from the energy storage means, the energy storage means may become exhausted and the climate control system rendered inoperable. Such a situation could occur for example if a heavily laden vehicle is driving up a long incline and powertrain torque demand exceeds the available torque.

Rather than deny the climate control system any power, in embodiments of the present invention the controller reserves a prescribed amount of powertrain torque, minimum auxiliary load powertrain torque amount, optionally a prescribed proportion or a prescribed absolute amount, in order to allow the climate control system to receive at least some power so that it can continue to operate. The amount reserved may be an amount that is small compared with total powertrain torque, such as around 10% of total powertrain torque, so that any impact on powertrain performance is also relatively small.

In some embodiments, the amount of power reserved for the climate control system may be determined at least in part in dependence on a temperature value, optionally an external ambient temperature value.

In an embodiment, the prescribed amount of powertrain torque, minimum auxiliary load powertrain torque, may be determined by the controller in dependence at least in part on one or more vehicle operating conditions.

In another embodiment, the prescribed amount of powertrain torque, minimum auxiliary load powertrain torque, may be determined at least in part in dependence on vehicle speed.

Optionally, the prescribed minimum auxiliary load powertrain torque amount is reduced when vehicle speed is below a prescribed threshold value.

This feature has the advantage that increased powertrain drive torque may be made available to one or more wheels when a vehicle accelerates from a stationary condition or from a relatively low speed. Thus, any reduction in vehicle performance when accelerating from rest or from a relatively low speed that would otherwise be experienced may be reduced or substantially eliminated.

In an embodiment, the prescribed minimum auxiliary load powertrain torque amount may be determined at least in part in dependence on engine speed.

The prescribed minimum auxiliary load powertrain torque amount may be reduced when engine speed is below a prescribed value, indicating the vehicle may be moving at a relatively low speed, or may be stationary. This feature enables an increase in the rate of angular acceleration of a driveshaft of the engine to higher speeds when vehicle acceleration is required, improving vehicle performance and user enjoyment.

In another embodiment, the prescribed minimum auxiliary load powertrain torque amount may be determined at least in part in dependence on driving surface gradient.

Optionally, the prescribed minimum auxiliary load powertrain torque amount is determined at least in part in dependence on vehicle load, being an amount of powertrain loading due to carried or towed mass.

That is, by vehicle loading is meant a load on the powertrain due to mass carried or towed by the vehicle. The prescribed minimum auxiliary load powertrain torque amount may in addition be dependent on relative weight distribution between two or more axles of the vehicle.

Optionally, the prescribed minimum auxiliary load powertrain torque amount may be determined as a prescribed proportion of total available powertrain torque or as an absolute amount of powertrain torque.

The controller may be configured to control a parallel hybrid electric vehicle having electric propulsion means powered by energy storage means and electric generator means operable to be driven by the engine to recharge the energy storage means.

Application of aspects of the present invention to a hybrid electric vehicle may be particularly advantageous since an engine of the vehicle may be required to support charging of an energy storage means such as a battery in addition to providing propulsion (drive) torque, in the case of a parallel hybrid vehicle.

The controller may be operable to cause the electric generator means to generate electrical power to power the auxiliary load such that the amount of torque loading placed on the powertrain by the generator means does not exceed the prescribed minimum auxiliary load powertrain torque amount.

In a further aspect of the invention for which protection is sought there is provided a vehicle comprising a controller according to a preceding aspect.

In one aspect of the invention for which protection is sought there is provided a method of controlling a vehicle having a powertrain comprising an engine, the method comprising:

receiving a signal indicative of an amount of powertrain drive torque required to be applied to one or more wheels, powertrain wheel drive torque demand; and receiving a signal indicative of an amount of powertrain load torque required to support an auxiliary powertrain load, powertrain auxiliary load torque demand, that is in addition to the powertrain wheel drive torque demand, the method comprising limiting the amount of powertrain drive torque available to the one or more wheels and limiting the amount of powertrain load torque available to support the auxiliary load such that when a sum of the amount of powertrain wheel drive torque demand and the amount of auxiliary load torque demand exceeds the available powertrain torque, the one or more auxiliary loads still receive at least a prescribed minimum auxiliary load powertrain torque amount.

In an aspect of the invention for which protection is sought there is provided a computer readable medium carrying computer program code for controlling a vehicle to carry out the method of a preceding aspect.

Within the scope of this application it is envisaged that the various aspects, embodiments, examples, features and alternatives set out in the preceding paragraphs, in the claims and/or in the following description and drawings may be taken independently or in any combination. Features described with reference to one embodiment are applicable to all embodiments, unless there is incompatibility of features.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

Embodiments of the invention will now be described with reference to the accompanying figures in which.

DETAILED DESCRIPTION

Figure 1:
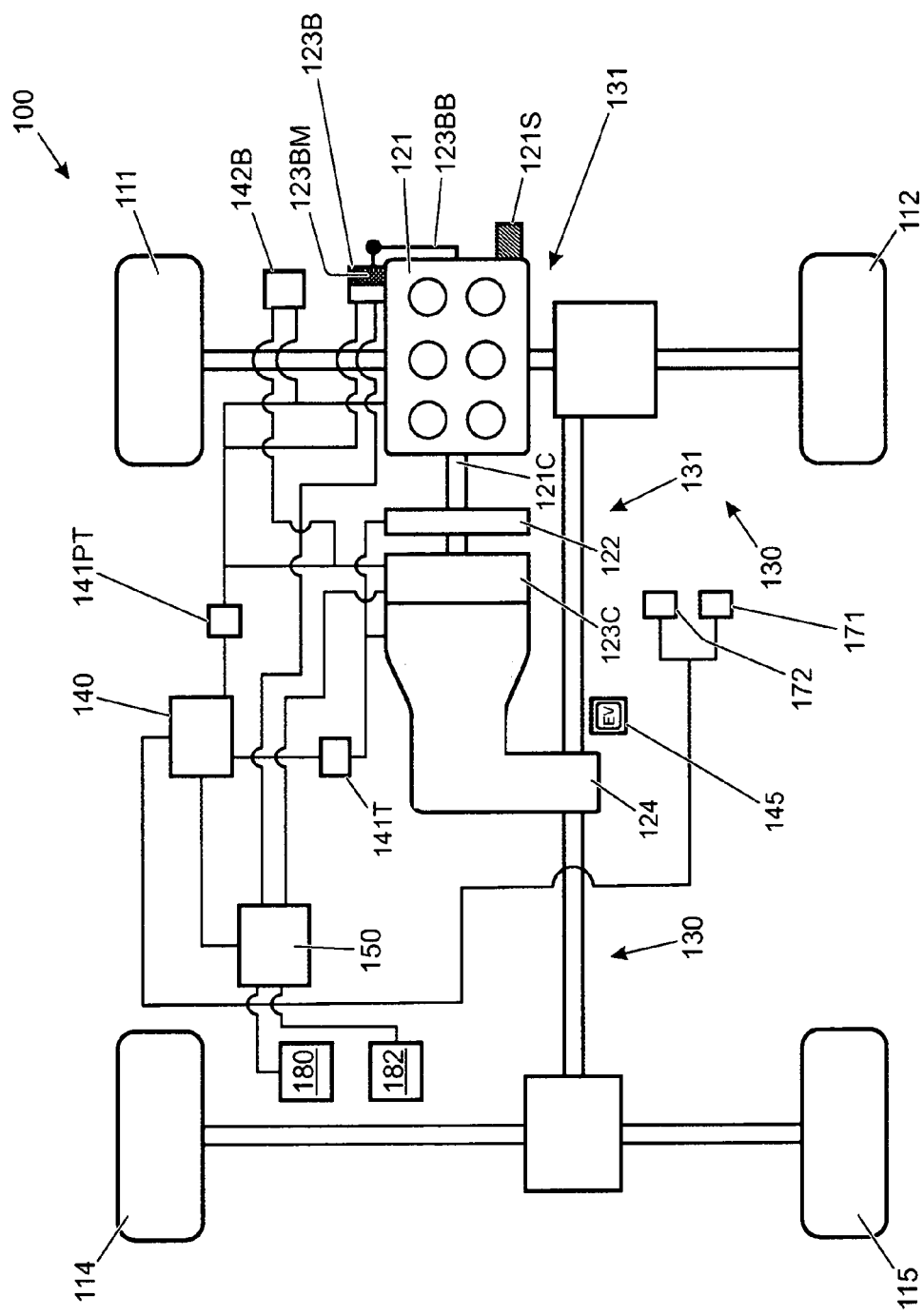
FIG. 1 is a schematic illustration of a hybrid electric vehicle according to an embodiment of the present invention.

In one embodiment of the invention a hybrid electric vehicle 100 is provided as shown in FIG. 1. The vehicle 100 has an engine 121 coupled to a belt integrated starter generator (BISG) 123B. The BISG 123B may also be referred to as a belt integrated (or belt mounted) motor generator and is operable to crank the engine 121 when starting is required. In addition or instead, a dedicated starter motor may be provided. In some embodiments therefore, a BISG may be provided but a separate starter motor is employed for starting the engine 121. The engine 121 is coupled in turn to a crankshaft-integrated starter/generator (CIMG) 123C by means of a clutch 122. The clutch 122 may also be referred to as a KO clutch 122.

The CIMG 123C is integrated into a housing of a transmission 124 which is in turn coupled to a driveline 130 of the vehicle 100 thereby to drive a pair of front wheels 111, 112 and a pair of rear wheels 114, 115 of the vehicle 100. The driveline 130 in combination with the transmission 124, CIMG 123C, clutch 122, engine 121 and BISG 123B may be considered to form part of a powertrain 131 of the vehicle 100. Wheels 111, 112, 114, 115 arranged to be driven by the driveline 130 may also be considered to form part of the powertrain 131.

It is to be understood that other arrangements are also useful. For example the driveline 130 may be arranged to drive the pair of front wheels 111, 112 only or the pair of rear wheels 114, 115 only, or to be switchable between a two wheel drive mode in which the front or rear wheels only are driven and a four wheel drive mode in which the front and rear wheels are driven.

The BISG 123B and CIMG 123C are arranged to be electrically coupled to a charge storage module 150 having a battery and an inverter. The module 150 is operable to supply the BISG 123B and/or CIMG 123C with electrical power when one or both are operated as propulsion motors. Similarly, the module 150 may receive and store electrical power generated by the BISG 123B and/or CIMG 123C when one or both are operated as electrical generators. In some embodiments, the CIMG 123C and BISG 123B may be configured to generate different electrical potentials to one another. Accordingly, in some embodiments each is connected to a respective inverter adapted to operate at the corresponding potential of the CIMG 123C or BISG 123B. Each inverter may have a respective battery associated therewith. In some alternative embodiments the CIMG 123C and BISG 123B may be coupled to a single inverter which is adapted to receive charge from the CIMG 123C and BISG 123B at the respective potentials and to store the charge in a single battery. Other arrangements are also useful.

As noted above, the BISG 123B has an electric machine 123BM that is drivably coupled to a crankshaft 121C of the engine 121 by means of a belt 123BB. The BISG 123B is operable to provide torque to the crankshaft 121C when it is required to start the engine 121 or when it is required to provide torque-assist to the driveline 130 as discussed in further detail below.

The vehicle 100 has a vehicle controller 140 operable to command a powertrain controller 141PT to control the engine 121 to switch on or off and to generate a required amount of torque. The vehicle controller 140 is also operable to command the powertrain controller 141PT to control the BISG 123B to apply a required value of positive or negative torque (operating as a propulsion motor or a generator) to the engine 121. Similarly, the vehicle controller 140 may command the CIMG 123C to apply a required value of positive or negative torque (again operating as a propulsion motor or a generator) to the driveline 130 via the transmission 124.

The vehicle has an accelerator pedal 171 and a brake pedal 172. The accelerator pedal 171 provides an output signal to the vehicle controller 140 indicative of an amount by which the pedal 171 is depressed. The vehicle controller 140 is arranged to determine the amount of driver demanded torque based on the accelerator pedal position and one or more other vehicle parameters including engine speed W. In some embodiments, the powertrain controller 141 PT is arranged to receive the accelerator pedal position signal and calculate the amount of driver demanded torque.

The vehicle 100 of FIG. 1 is operable by the vehicle controller 140 in an electric vehicle (EV) mode in which the clutch 122 is open and the crankshaft 121C is stationary. In EV mode the CIMG 123C is operable to apply positive or negative torque to the driveline 130 via the transmission 124. Negative torque may be applied for example when regenerative braking is required under the control of a brake controller 142B.

The powertrain 131 is operable in one of a plurality of parallel modes in which the engine 121 is switched on and the clutch 122 is closed. The parallel modes include a 'parallel boost' mode in which the CIMG 123C is operated as a motor to provide drive torque to the driveline 130 In addition to the torque provided by the engine 121. In the present embodiment the powertrain 131 is operated in the parallel boost configuration when the amount of driver demanded torque exceeds the maximum torque available from the engine 121. The amount of additional torque available from the CIMG 123C may be determined in dependence on the vehicle configuration as described in more detail below. It is to be understood that the feature of torque boost increases the available drive torque beyond that which is available from the engine 121 alone.

The parallel modes also include a parallel torque filling mode and a parallel torque assist mode. The parallel torque filling mode is a mode in which the CIMG 123C delivers drive torque to the driveline 130 in addition to the engine 121 in order to meet driver demand for torque more quickly than if the engine 121 alone delivers drive torque. Torque filling provides the benefit that driver torque demand may be satisfied more quickly, improving a responsiveness of the vehicle to an increase in torque demand.

In the present embodiment torque filling is implemented when a rate of increase of driver torque demand relative to the amount of torque delivered by the engine 121 exceeds a prescribed value. Once driver torque demand has been satisfied, the amount of torque delivered by the CIMG 123C decreases as the amount of torque delivered by the engine 121 increases to meet driver demand substantially entirely, without a requirement for additional torque from the CIMG 123C.

In the torque-assist parallel mode the CIMG 123C provides steady-state drive torque in addition to the engine 121 in order to relieve loading on the engine 121. This may assist in reducing fuel consumption and/or vehicle emissions. Torque-assist may be considered to be distinct from 'torque filling', the latter being employed in a transient manner when an increase in drive torque is required.

The powertrain 131 may alternatively be operated in a parallel recharge mode in which the CIMG 123C is driven as a generator by the engine 121 to recharge the charge storage module 150.

The vehicle 100 has an electrically powered climate control system 180 that is arranged to draw electrical power from the charge storage module 150 when required. The climate control system 180 represents a non-essential auxiliary electrical load. By non-essential is meant that the vehicle 100 is still capable of driving whether or not the climate control system 180 Is operational. One or more other non-essential auxiliary electrical systems 182 may also be present. It is to be understood that the vehicle 100 also has 'essential' electrical loads which are always provided with electrical power. The essential loads include loads for powering an HMI system and external lighting loads such as headlamps, brake lights and the like. In some embodiments, the essential loads may be denied power only if the provision of power to the essential loads would otherwise cause the engine 121 to stall.

It is to be understood that in the present embodiment the controller 140 is configured to ensure that at least a prescribed proportion of a maximum powertrain torque capability at a given moment in time is available to generate power to drive the one or more auxiliary loads 180, 182 even when an amount of demanded drive torque to one or more wheels is equal to or exceeds the maximum available powertrain torque capability. Such torque may be referred to as driver demanded torque, although in some embodiments it may be provided by a speed control system such as a cruise control system in instead of directly from a driver, via the accelerator pedal 171.

In the present embodiment, the controller 140 ensures that up to 10% of the maximum available powertrain torque is available to drive the one or mode auxiliary loads 180, 182. Thus, up to 90% of the maximum available powertrain torque is available to drive the one or more wheels, subject to any inherent powertrain losses. Other proportions of maximum available powertrain torque are also useful such as 5%, 15% or any other suitable proportion.

It is to be understood that whilst reference is made herein to powertrain torque, reference may alternatively be made to powertrain power, for example as measured in Watts or kiloWatts. Importantly, the controller 140 is configured to ensure that at least some powertrain energy is supplied to meet the demand of one or more auxiliary loads when the one or more auxiliary loads so demand, even at relatively high levels of wheel drive torque demand.

A priority hierarchy may be set as between the auxiliary loads, such that a prescribed amount or proportion of the available torque or energy for the auxiliary loads is made available to one or more loads in preference to one or more other loads. An electric winch, for example, might be given priority over a load associated with a climate control system such as an air-conditioning compressor.

In the case that no wheel drive torque is being demanded from the powertrain, any auxiliary load demand placed on the powertrain is met substantially in full, up to the powertrain's maximum capability although a cap may be placed on the amount of torque that may be delivered to one or more auxiliary loads in some embodiments.

If a sum of the powertrain wheel drive torque demand and auxiliary load torque demand does not exceed the maximum available powertrain torque, both torque demands are satisfied regardless of their relative values.

However, if the total powertrain torque demand exceeds the maximum available amount, the amount of delivered powertrain wheel drive torque and delivered auxiliary load torque is set according to the rule that the amount of delivered powertrain wheel drive torque is guaranteed to be up to a value of 90% of the maximum available powertrain torque and the amount of delivered auxiliary load torque is guaranteed to be up to a value of 10% of the maximum available powertrain torque. The amount of one of the delivered powertrain wheel drive torque and delivered auxiliary load torque may be higher than 90% and 10%, respectively, provided the torque demand by the other has been met in full. Thus if the powertrain wheel drive torque demand is 95% of the maximum available and the amount of auxiliary load torque demand is 7% of the maximum available, the auxiliary load torque demand is fully satisfied and the remaining 93% of available powertrain torque is used to meet the majority of the powertrain wheel drive torque demand.

It is to be understood that, under certain exceptional conditions, a deviation from the guaranteed amounts may be permitted. In the present embodiment, if the vehicle is stationary or travelling at a speed that is below a prescribed minimum vehicle speed, the amount of delivered powertrain wheel drive torque is permitted to have a larger proportion of the available powertrain torque than if the speed is above the prescribed minimum speed. In the present embodiment, the amount of delivered powertrain wheel drive torque is permitted to have a value up to 100% of the available powertrain torque if so demanded. Other values are also useful. This is so as to provide enhanced vehicle acceleration at relatively low speeds. The prescribed minimum vehicle speed may be around 20 to 30 kph although other values are also useful.

Figure 2:
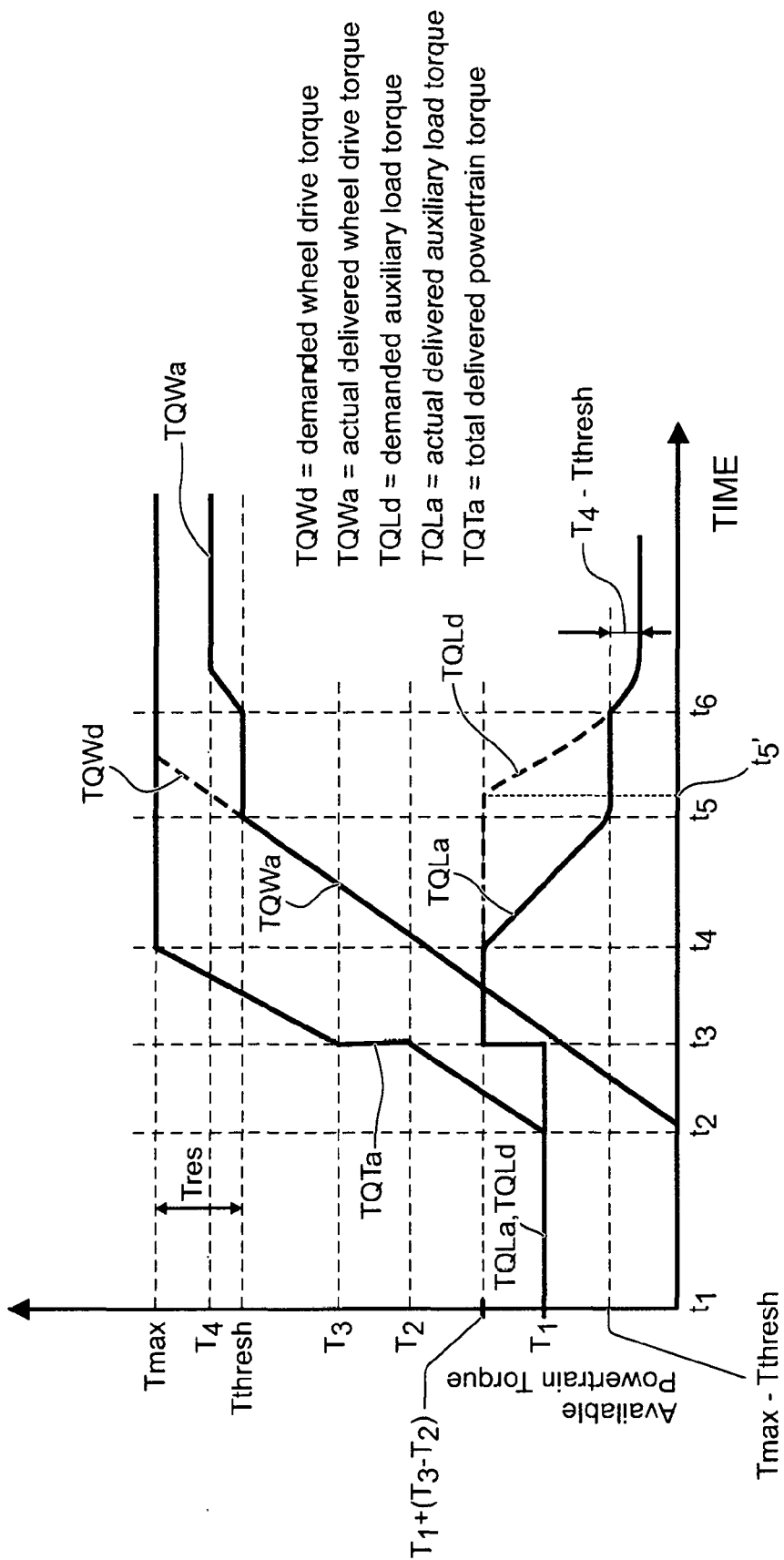
FIG. 2 is a plot of various powertrain torque demands as a function of time in a vehicle according to an embodiment of the present invention, illustrating operation of the vehicle.

A deviation from the guaranteed amounts may also be useful in dependence on engine speed in a manner corresponding to that for vehicle speed described above, An example of operation of a vehicle 100 according to an embodiment of the present invention will now be described by reference to FIG. 2. FIG. 2 is a plot of demanded powertrain wheel drive torque TQWd, actual delivered powertrain wheel drive torque TQWa, demanded auxiliary load torque TQLd, actual delivered auxiliary load torque TQLa and total actual delivered powertrain torque TQTa as a function of time. The torque values may be defined in terms of wheel torque or crankshaft torque. Crankshaft torque may be more useful in some embodiments since it may be more conveniently measured, and a conversion to wheel torque is not required.

The maximum available powertrain torque is indicated Tmax in FIG. 2. The threshold value of powertrain torque Tthresh that is reserved for powertrain wheel drive torque is also shown. The difference Tmax−Tthresh is the amount of powertrain torque that is reserved for the auxiliary loads, Tres. It is to be understood that in some embodiments the controller 140 is configured to ensure that the load torque placed on the powertrain cannot exceed the maximum engine torque under any circumstances. This in turn ensures that the engine 121 cannot be caused to stall due to load torque placed on the engine 121.

Between times t1 and t2, TQWd is zero and the demanded auxiliary load torque TQLd is fully satisfied, i.e. TQLa=TQLd=T1, even though TQLd is greater than the reserved amount Tres.

At time t2 the amount of demanded powertrain wheel drive torque TQWd begins to increase, and the amount of delivered powertrain wheel drive torque TQWa increases to fully satisfy TQWd.

At time t3 the amount of TQLd increases abruptly by an amount (T3−T2) as shown in FIG. 2. However, the total powertrain torque demand TQLd+TQWd is still less than Tmax and therefore TQLd and TQWd are both met.

At time t4 the sum of TQLd and TQWd begins to exceed Tmax, whilst the value of TQWa is still less than Tthresh. Accordingly, in order to satisfy the requirement that the powertrain wheel drive torque demand must be satisfied at all times up to the reserved amount Tthresh, the amount of actual delivered auxiliary load torque TQLa begins to reduce even though TQLd remains the same.

At time t5 the value of TQWa becomes equal to Tthresh. Accordingly, the controller 140 does not allow TQWa to increase any further, and the value of TQLa is no longer decreased.

At time t5' the value of TQLd begins to decrease, until at time t6 the value of TQLd falls below the reserved amount Tres. TQLd is therefore met in full, whilst the value of TQWa is increased in proportion to the decrease in TQLa below the reserved amount Tres. Accordingly, a greater proportion of TQWd is met than that specified by Tthresh. Thus, the value of TQWa exceeds Tthresh during the period for which TQLa is less than Tres and TQWd exceeds Tthresh.

As noted above, in the present embodiment Tthresh is 90% and Tres is therefore 10%. However, other values are also useful.

Embodiments of the present invention have the advantage that a certain prescribed amount of maximum powertrain torque, which may be a prescribed proportion or an absolute amount, may be reserved for the provision of powertrain wheel drive torque for driving one or more driving wheels and a corresponding amount reserved for the provision of auxiliary load torque, for driving one or more auxiliary loads. This allows the auxiliary loads to continue to receive at least a certain amount of powertrain torque in order to maintain at least partial functioning of one or more systems associated with the one or more auxiliary loads, even at relatively high values of demanded powertrain wheel drive torque. Thus, rather than terminating the supply of powertrain torque to drive the one or more auxiliary loads when the amount of powertrain wheel torque demand saturates the maximum available powertrain torque, embodiments of the present invention reserve a prescribed amount of powertrain torque for powering the one or more auxiliary loads.

It is to be understood that powering the one or more loads may be accomplished by direct mechanical coupling of the loads to the powertrain in some embodiments. Thus in a vehicle such as a conventional (non-hybrid) vehicle, or in a hybrid vehicle, an auxiliary load such as a compressor of an air-conditioning system may be permitted to apply to the powertrain a torque load of up to the amount that is determined by the controller 140 to be permitted.

In the case of an electrical load, an electrical generator may be permitted to apply a torque loading to the powertrain up to the permitted amount, in order to provide the electrical load with at least some electrical power.

In some alternative embodiments including the present embodiment, powering of the one or more loads may be accomplished by operating the CIMG 123C as a generator. Accordingly, powertrain boost torque, that would otherwise be provided by the CIMG 123C operating as a motor, will be unavailable. Accordingly, the maximum powertrain torque value may be deemed to be that which may be developed by the engine 121 alone. Accordingly the available powertrain wheel drive torque and available auxiliary load torque may be determined to be corresponding proportions of the maximum torque that the engine 121 is capable of developing, rather than the maximum torque the powertrain 131 as a whole is capable of developing, including engine 121 and the CIMG 123C operated as a motor.

In some embodiments, the BISG 123B may be employed to generate electrical power to power one or more of the one or more auxiliary loads 180, 182.

Figure 3:
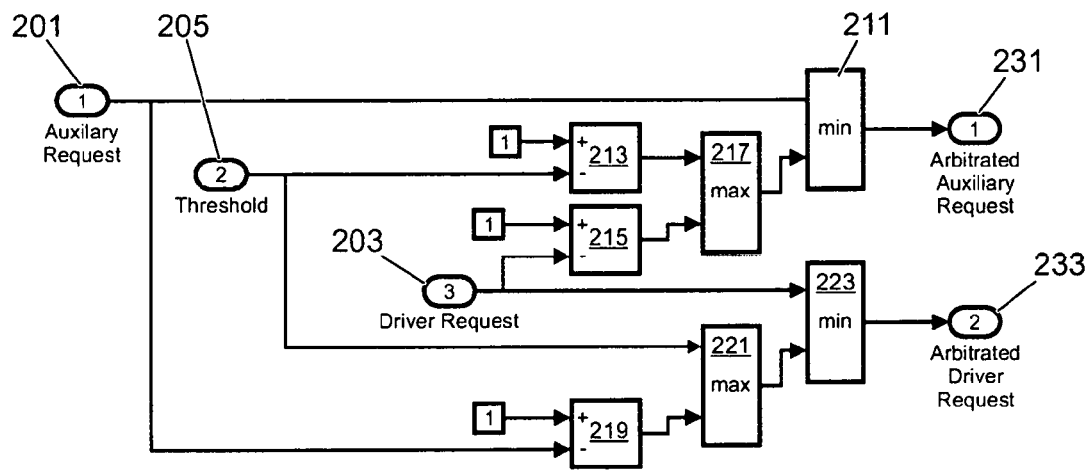
FIG. 3 is a schematic diagram of a portion of a controller 140 according to an embodiment of the present invention.
Figure 4:
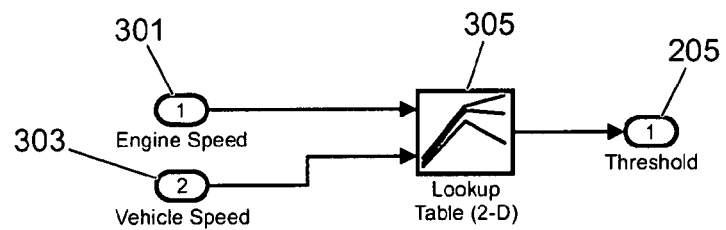
FIG. 4 is a schematic illustration of a further portion of a controller 140 according to an embodiment of the present invention.

FIG. 3 shows a schematic diagram of a portion of the controller 140 implementing an embodiment of the present invention. The functionality illustrated in FIG. 3 is implemented by the controller 140 in computer program code and will be described with respect to function blocks for the purpose of ease of understanding. The skilled person will recognise that the functionality may be implemented in computer program code in any one of a number of different ways, or in a dedicated hardware circuit.

The function performed by the portion of the controller 140 illustrated in FIG. 3 receives an input signal in respect of the amount of demanded auxiliary load torque, 'auxiliary request' 201, the amount of demanded powertrain wheel torque, 'driver request' 203 and a reference or 'threshold' torque value 205. The signals 201, 203, 205 each have a value between 0 and 1, representing fractions of the maximum available powertrain torque Tmax at a given moment in time.

Signal 201 is input to a minimiser function block 211 that outputs the lower of signal 201 and a further signal input thereto.

The further signal input to the minimiser function block 211 is the larger of a difference between the threshold signal 205 and 1 (calculated by function block 213) and the difference between driver request signal 203 and 1 (calculated by function block 215).

The signal output by the minimiser function block 211 is the arbitrated auxiliary load torque value, i.e. the value of auxiliary load torque that will be actually delivered by the powertrain 131.

Driver request signal 203 is also fed to a further minimiser function block 223 that outputs the smaller of signal 203 and a further signal input thereto. The further signal is the larger of the threshold signal 205 and a difference between auxiliary request signal 201 and 1.

The signal output by minimiser function block 223 is an arbitrated driver requested torque value or delivered wheel drive torque value, i.e. the value of wheel drive torque that will be actually delivered by the powertrain 131.

The value of threshold signal 205 is determined by reference to a speed of the engine 121 and a speed of the vehicle 100. Signals 301 and 303 correspond respectively to the engine speed and vehicle speed. The signals 301, 303 are input to a look up table (LUT) function block 305 that outputs a value of the threshold signal 205.

It is to be understood that the controller 140 is configured to store computer program code for causing one or more computing devices of the controller 140 to perform the method of vehicle control described herein. It is to be understood that a controller according to an embodiment of the present invention may be provided by a plurality of computing devices. The functionality described as being performed by the controller may be performed by a plurality of computing devices, control modules or the like, optionally at different physical locations of a vehicle.

It is to be understood that the controller 140 is configured to store computer program code for causing one or more computing devices of the controller 140 to perform the method of vehicle control described herein. It is to be understood that a controller according to an embodiment of the present invention may be provided by a plurality of computing devices. The functionality described as being performed by the controller may be performed by a plurality of computing devices, control modules or the like, optionally at different physical locations of a vehicle.

Embodiments of the present invention may be understood by reference to the following numbered paragraphs:

1. A controller for a vehicle having a powertrain comprising an engine, the controller being operable to:
   receive a signal indicative of an amount of powertrain drive torque required to be applied to one or more wheels, powertrain wheel drive torque demand; and
   receive a signal indicative of an amount of powertrain load torque required to support an auxiliary powertrain load, powertrain auxiliary load torque demand, that is in addition to the powertrain wheel drive torque demand,
   the controller being operable to limit the amount of powertrain drive torque available to the one or more wheels and to limit the amount of powertrain load torque available to support the auxiliary load such that when a sum of the amount of powertrain wheel drive torque demand and the amount of auxiliary load torque demand exceeds the available powertrain torque, the one or more auxiliary loads may still receive at least a prescribed minimum auxiliary load powertrain torque amount.

2. A controller according to paragraph 1 wherein the prescribed amount of powertrain torque, minimum auxiliary load powertrain torque, is determined by the controller in dependence at least in part on one or more vehicle operating conditions.

3. A controller according to paragraph 2 wherein the prescribed amount of powertrain torque, minimum auxiliary load powertrain torque, is determined at least in part in dependence on vehicle speed.

4. A controller according to paragraph 3 wherein the prescribed minimum auxiliary load powertrain torque amount is reduced when vehicle speed is below a prescribed threshold value.

5. A controller according to paragraph 2 wherein the prescribed minimum auxiliary load powertrain torque amount is determined at least in part in dependence on engine speed.

6. A controller according to paragraph 2 wherein the prescribed minimum auxiliary load powertrain torque amount is determined at least in part in dependence on driving surface gradient.

7. A controller according to paragraph 2 wherein the prescribed minimum auxiliary load powertrain torque amount is determined at least in part in dependence on vehicle load, being an amount of powertrain loading due to carried or towed mass.

8. A controller according to paragraph 1 wherein the prescribed minimum auxiliary load powertrain torque amount is determined as a prescribed proportion of total available powertrain torque or as an absolute amount of powertrain torque.

9. A controller according to paragraph 1 configured to control a parallel hybrid electric vehicle having an electric propulsion motor powered by an energy storage device, and an electric generator operable to be driven by the engine to recharge the energy storage device.

10. A controller according to paragraph 9 operable to cause the electric generator to generate electrical power to power the auxiliary load such that the amount of torque loading placed on the powertrain by the generator does not exceed the prescribed minimum auxiliary load powertrain torque amount.

11. A vehicle comprising a controller according to paragraph 1.

12. A method of controlling a vehicle having a powertrain comprising an engine, the method comprising:
receiving a signal indicative of an amount of powertrain drive torque required to be applied to one or more wheels, powertrain wheel drive torque demand; and
receiving a signal indicative of an amount of powertrain load torque required to support an auxiliary powertrain load, powertrain auxiliary load torque demand, that is in addition to the powertrain wheel drive torque demand,
the method comprising limiting the amount of powertrain drive torque available to the one or more wheels and limiting the amount of powertrain load torque available to support the auxiliary load such that when a sum of the amount of powertrain wheel drive torque demand and the amount of auxiliary load torque demand exceeds the available powertrain torque, the one or more auxiliary loads still receive at least a prescribed minimum auxiliary load powertrain torque amount.

13. A computer readable medium carrying computer program code for controlling a vehicle to carry out the method of paragraph 12.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A controller for a vehicle having wheels and a powertrain comprising an engine, the controller configured to:
receive a signal indicative of powertrain wheel drive torque demand; and
receive a signal indicative of powertrain auxiliary load torque demand,
wherein the controller is configured to limit an amount of powertrain wheel drive torque available to one or more of the wheels and to limit an amount of powertrain auxiliary load torque available to support an auxiliary load such that when a sum of an amount of powertrain wheel drive torque demand and an amount of powertrain auxiliary load torque demand exceeds available powertrain torque, at least a prescribed minimum auxiliary load powertrain torque amount is available to the auxiliary load.

2. The controller of claim 1, wherein the prescribed minimum auxiliary load powertrain torque amount is determined by the controller in dependence on one or more vehicle operating conditions.

3. The controller of claim 2, wherein the prescribed minimum auxiliary load powertrain torque amount is determined in dependence on vehicle speed.

4. The controller of claim 3, wherein the prescribed minimum auxiliary load powertrain torque amount is reduced when vehicle speed is below a prescribed threshold value.

5. The controller of claim 2, wherein the prescribed minimum auxiliary load powertrain torque amount is determined in dependence on engine speed.

6. The controller of claim 2, wherein the prescribed minimum auxiliary load powertrain torque amount is determined in dependence on a driving surface gradient.

7. The controller of claim 2, wherein the prescribed minimum auxiliary load powertrain torque amount is determined in dependence on vehicle load due to a carried or towed mass.

8. The controller of claim 1, wherein the prescribed minimum auxiliary load powertrain torque amount is determined as a prescribed proportion of total available powertrain torque or as an absolute amount of powertrain torque.

9. The controller of claim 1, further configured to control a parallel hybrid electric vehicle having electric propulsion powered by energy storage, and electric generator operable to be driven by the engine to recharge the energy storage.

10. The controller of claim 9, further configured to cause the electric generator to generate electrical power to power the auxiliary load such that an amount of torque loading placed on the powertrain by the electric generator does not exceed the prescribed minimum auxiliary load powertrain torque amount.

11. A vehicle comprising the controller of claim 1.

12. A method of controlling a vehicle having wheels and a powertrain comprising an engine, the method comprising:
receiving at a controller a signal from an accelerator pedal of the vehicle or a speed control system of the vehicle that is indicative of powertrain wheel drive torque demand;
receiving at the controller a signal from one or more vehicle systems that is indicative of powertrain auxiliary load torque demand; and
using the controller to limit an amount of powertrain wheel drive torque available to one or more of the wheels and to limit an amount of powertrain auxiliary load torque available to support an auxiliary load such that, when a sum of an amount of powertrain wheel drive torque demand and an amount of powertrain auxiliary load torque demand exceeds available powertrain torque, at least partial functioning of the one or more vehicle systems associated with the auxiliary load can be maintained; even at relatively high values of demanded powertrain wheel drive torque.

13. A non-transitory computer readable medium comprising computer program code that, when executed on a processor, causes the processor to:
provide a signal indicative of powertrain wheel drive torque demand to a vehicle controller;
provide a signal indicative of powertrain auxiliary load torque demand to the vehicle controller; and
use the vehicle controller to limit an amount of powertrain wheel drive torque available to one or more wheels of the vehicle and to limit an amount of powertrain auxiliary load torque available to support an auxiliary load such that when a sum of an amount of powertrain wheel drive torque demand and an amount of powertrain auxiliary load torque demand exceeds available powertrain torque, at least a prescribed minimum auxiliary load powertrain torque amount is available to the auxiliary load.

* * * * *